US010822987B1

(12) United States Patent
Tardif et al.

(10) Patent No.: US 10,822,987 B1
(45) Date of Patent: Nov. 3, 2020

(54) TURBINE STATOR OUTER SHROUD COOLING FINS

(71) Applicant: PRATT & WHITNEY CANADA CORP., Longueuil (CA)

(72) Inventors: Marc Tardif, Candiac (CA); Michael Papple, Verdun (CA); Jason Gillespie, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/385,428

(22) Filed: Apr. 16, 2019

(51) Int. Cl.
*F01D 25/12* (2006.01)
*F01D 11/08* (2006.01)

(52) U.S. Cl.
CPC .............. *F01D 11/08* (2013.01); *F01D 25/12* (2013.01); *F05D 2240/10* (2013.01); *F05D 2250/28* (2013.01); *F05D 2260/201* (2013.01); *F05D 2260/22141* (2013.01)

(58) Field of Classification Search
None
See application file for complete search history.

(56) References Cited

U.S. PATENT DOCUMENTS

| | | | |
|---|---|---|---|
| 3,804,551 A * | 4/1974 | Moore | F01D 5/185 416/97 R |
| 4,017,213 A * | 4/1977 | Przirembel | F01D 5/187 416/97 A |
| 5,201,847 A | 4/1993 | Whidden | |
| 6,019,572 A * | 2/2000 | Cunha | F01D 5/187 415/114 |
| 6,142,734 A | 11/2000 | Lee | |
| 6,158,962 A | 12/2000 | Lee et al. | |
| 6,379,528 B1 | 4/2002 | Lee et al. | |
| 6,402,464 B1 * | 6/2002 | Chiu | F01D 5/288 165/133 |
| 6,508,623 B1 * | 1/2003 | Shiozaki | F01D 9/04 415/115 |
| 6,641,363 B2 | 11/2003 | Barrett et al. | |
| 6,832,893 B2 | 12/2004 | Chevrefils et al. | |
| 7,097,424 B2 | 8/2006 | Cunha et al. | |
| 7,293,957 B2 | 11/2007 | Ellis et al. | |

(Continued)

FOREIGN PATENT DOCUMENTS

CN 104791020 6/2016
CN 103291374 12/2016
(Continued)

*Primary Examiner* — Michael Lebentritt
(74) *Attorney, Agent, or Firm* — Norton Rose Fulbright Canada LLP

(57) ABSTRACT

A stator of a gas turbine engine is provided. A static shroud of the stator defines a platform having a radially outer surface. An impingement plate has impingement holes extending therethrough, and the impingement plate is radially spaced apart from the radially outer surface of the platform. The impingement holes are configured to direct a high-speed cooling air flow transversally to the radially outer surface of the stator shroud. A plurality of protrusions project away from the radially outer surface of the platform along a protrusion axis. The protrusions have a cruciate cross-sectional shape when viewed in a plane normal to the protrusion axis. A method of cooling a stator of a gas turbine engine is also provided.

20 Claims, 4 Drawing Sheets

(56) References Cited

U.S. PATENT DOCUMENTS

| | | | |
|---|---|---|---|
| 7,553,128 B2 | 6/2009 | Abdel-Messeh et al. | |
| 7,628,587 B2 | 12/2009 | McFeat et al. | |
| 7,758,309 B2 | 7/2010 | Bolms et al. | |
| 7,901,180 B2 | 3/2011 | Abdel-Messeh et al. | |
| 8,016,547 B2 | 9/2011 | Propheter-Hinckley | |
| 8,061,979 B1 | 11/2011 | Liang | |
| 8,303,258 B2 | 11/2012 | Aubin | |
| 8,403,632 B2 | 3/2013 | Surace et al. | |
| 8,727,725 B1* | 5/2014 | Liang | F01D 5/143 |
| | | | 416/97 R |
| 9,243,501 B2 | 1/2016 | Thomen et al. | |
| 9,243,502 B2* | 1/2016 | Xu | B22C 9/18 |
| 9,255,491 B2* | 2/2016 | Blaney | F01D 11/24 |
| 9,777,635 B2 | 10/2017 | Bergholz et al. | |
| 9,856,747 B2 | 1/2018 | Davis et al. | |
| 9,874,102 B2* | 1/2018 | Azad | F01D 5/18 |
| 10,012,238 B2 | 7/2018 | Robertson et al. | |
| 10,082,033 B2 | 9/2018 | Spangler | |
| 10,113,439 B2 | 10/2018 | Cortequisse | |
| 10,184,342 B2 | 1/2019 | Zhang et al. | |
| 10,202,864 B2 | 2/2019 | Clum et al. | |
| 10,280,762 B2 | 5/2019 | Mongillo et al. | |
| 10,280,793 B2 | 5/2019 | Vu | |
| 10,294,796 B2 | 5/2019 | Li et al. | |
| 10,323,526 B2 | 6/2019 | Tsypkaykin et al. | |
| 2002/0066273 A1 | 6/2002 | Kitamura et al. | |
| 2002/0172590 A1* | 11/2002 | Sreekanth | F01D 5/187 |
| | | | 415/115 |
| 2013/0183150 A1* | 7/2013 | Batt | F01D 25/24 |
| | | | 415/214.1 |
| 2013/0209217 A1* | 8/2013 | Butler | F01D 9/023 |
| | | | 415/1 |
| 2013/0251508 A1* | 9/2013 | Tardif | F01D 9/02 |
| | | | 415/115 |
| 2014/0047843 A1* | 2/2014 | Papple | F01D 25/12 |
| | | | 60/726 |
| 2016/0003070 A1 | 1/2016 | Kastel | |
| 2016/0194969 A1 | 7/2016 | Ols et al. | |
| 2016/0298459 A1 | 10/2016 | Bryant et al. | |
| 2016/0363053 A1 | 12/2016 | Miranda et al. | |
| 2017/0138211 A1* | 5/2017 | Fukui | F01D 25/12 |
| 2017/0159487 A1 | 6/2017 | Stapleton et al. | |
| 2018/0355726 A1* | 12/2018 | Perry, II | F01D 5/085 |
| 2018/0355727 A1 | 12/2018 | Walunj et al. | |
| 2019/0178102 A1* | 6/2019 | Synnott | B22C 9/10 |
| 2019/0186268 A1* | 6/2019 | Hjalmarsson | F01D 5/08 |
| 2020/0149477 A1* | 5/2020 | Barker | F01D 11/005 |

FOREIGN PATENT DOCUMENTS

| | | |
|---|---|---|
| CN | 105074132 | 5/2017 |
| EP | 709550 | 1/2000 |
| EP | 1907670 | 11/2008 |
| EP | 2093381 | 8/2009 |
| EP | 2458148 | 5/2012 |
| EP | 3047112 | 11/2018 |
| FR | 3001492 | 9/2017 |
| IN | 200702155 | 9/2008 |
| IN | 298219 | 7/2018 |
| WO | 1999006771 | 2/1999 |
| WO | 2015069495 | 5/2015 |
| WO | 2017026908 | 2/2017 |

\* cited by examiner

TURBINE STATOR OUTER SHROUD COOLING FINS

TECHNICAL FIELD

The application relates generally to air-cooling of hot surfaces in a gas turbine engine and, more particularly, to heat-exchange promoting structures on a hot surface of a gas turbine engine.

BACKGROUND OF THE ART

In a turbomachine, high pressure turbine (HPT) stators are subjected to the high-temperature gases coming from the combustion chamber. To protect such HPT stators from unacceptable thermally-induced degradation, various stator features, such as airfoils and inner and outer shrouds, may be cooled with air bled from the turbomachine compressor. Typically, the outer surface of the outer shroud of the HPT stator is cooled by air jets which are directed upon the outer surface of the HPT stator shroud.

Attempts have been made to increase the heat transfer away from the outer shrouds of the HPT stator. However, existing cooling features can be difficult to manufacture, may be prone to breaking, and/or may not provide optimal heat transfer regardless of the direction of cooling airflow thereacross.

SUMMARY

In one aspect, there is provided a stator of a gas turbine engine, the stator comprising: a static shroud of the stator defining a platform having a radially outer surface; an impingement plate having impingement holes extending therethrough, the impingement plate radially spaced apart from the radially outer surface of the platform, the impingement holes configured to direct a high-speed cooling air flow transversally to the radially outer surface of the stator shroud; and a plurality of protrusions projecting away from the radially outer surface of the platform along a protrusion axis, the protrusions having a cruciate cross-sectional shape when viewed in a plane normal to the protrusion axis.

In another aspect, there is provided a stator shroud of a high pressure turbine of a gas turbine engine, the stator shroud comprising: a shroud platform defining a hot gas side in fluid communication with a hot gas flow of the engine and an opposite back side defining a radially outer surface of the stator shroud; and a plurality of protrusions spaced apart from one another and projecting from the radially outer surface, the protrusions each having more than two elongate members intersecting each other and extending in different directions along the radially outer surface.

In a further aspect, there is provided a method of cooling a stator of a gas turbine engine, the method comprising: receiving a cooling air flow from bleed air of the engine into a cavity of the stator outside a shroud of the stator; directing the cooling air form the cavity directly onto a radially outer surface of a platform of the stator shroud in impingement cooling jets transverse to said radially outer surface, including directing the impingement cooling jets on a plurality of cruciate protrusions projecting from the radially outer surface with the cooling air; and channeling the cooling air flow outside the cavity via a cavity outlet.

DESCRIPTION OF THE DRAWINGS

Reference is now made to the accompanying figures in which.

DETAILED DESCRIPTION

Figure 1:
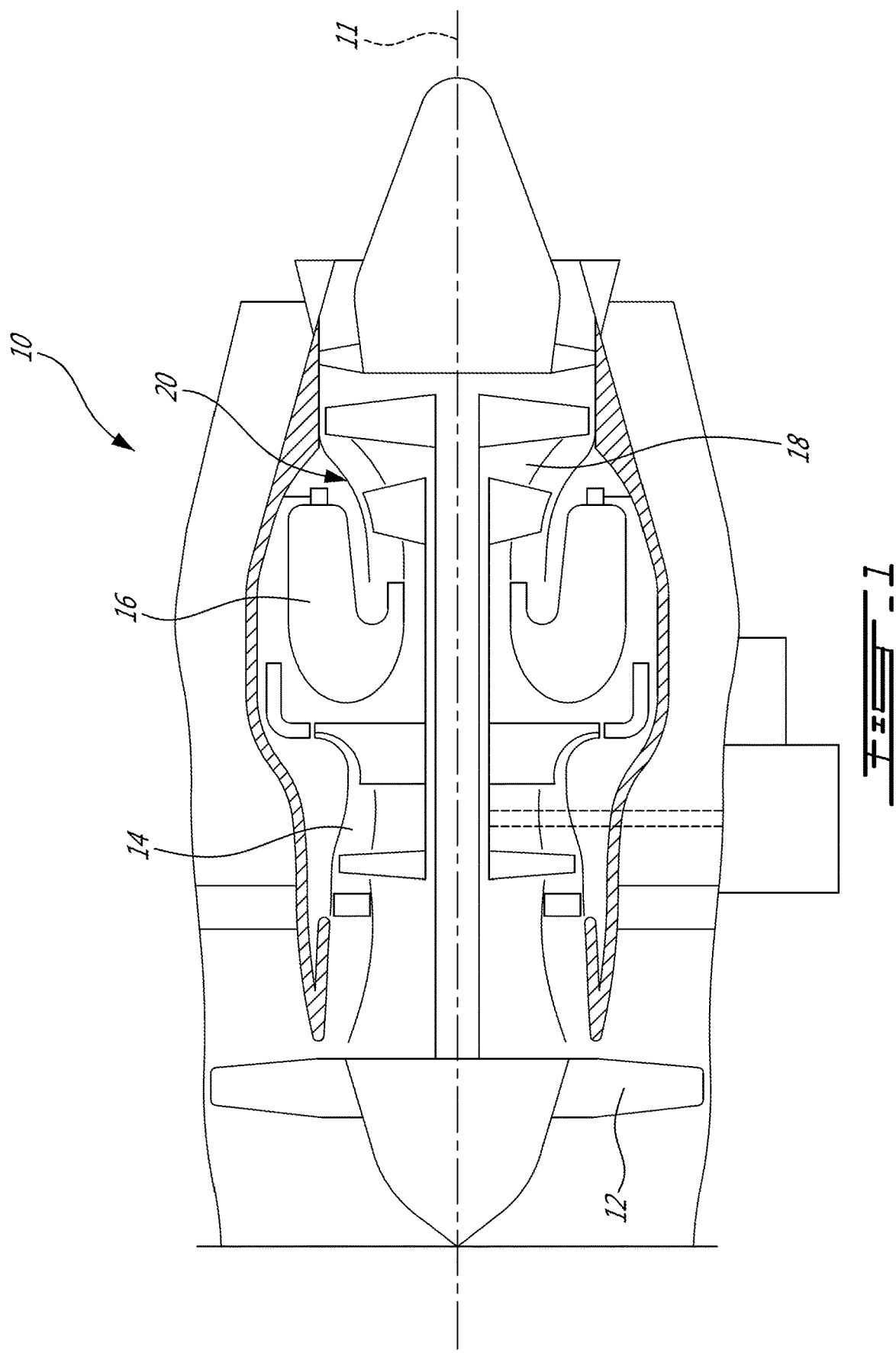
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section or high pressure compressor (HPC) assembly 14 for pressurizing the air, a combustor 16 in which the compressed air is mixed with fuel and ignited for generating an annular stream of hot combustion gases, and a turbine section or HPT assembly 18 for extracting energy from the combustion gases. Also shown is a central longitudinal axis 11 of the engine 10, which in this case also defines a rotational axis of the engine 10. Hot combustion gases are thus supplied to the HPT assembly 18. The HPT assembly 18 includes a stator shroud 20 surrounding the high pressure turbine rotor (not indicated).

Figure 2:
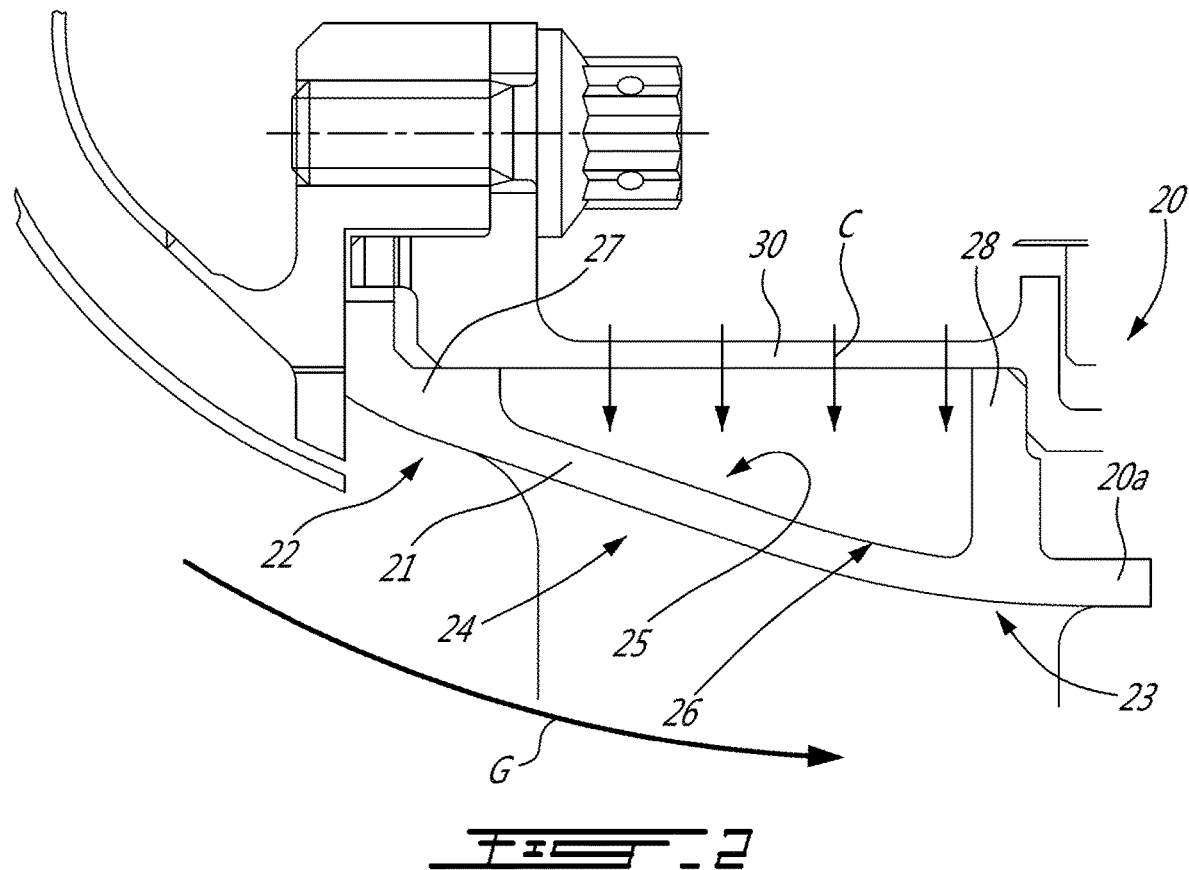
FIG. 2 is a schematic cross-sectional view of a portion of a stator shroud as used in the engine of FIG. 1.

Referring to FIG. 2, there is illustrated a stator shroud 20 of the engine 10. The stator shroud 20 may be an integral shroud ring or may be assembled as a plurality of stator shroud segments 20a, each forming a circumferential section of the stator shroud 20. For convenience of description, the stator shroud segment 20a is taken as an embodiment of the described technique, and is described with technical details hereinafter.

The stator shroud segment 20a includes a platform 21 which forms a circumferential section of a shroud ring of the stator shroud 20 when the segments 20a are assembled together. The platform 21 extends between opposite leading and trailing edges 22 and 23 with respect to a hot gas flow G which passes under the stator shroud 20, i.e. through the turbine blades, to rotate the high pressure turbine rotor. The platform 21 extends between two opposite substantially axial side edges (not shown) with respect to the central longitudinal axis 11 of the engine 10. The platform 21 thus defines a hot gas side 24 having a radially inner surface (not indicated) which may be substantially axial and is exposed directly to the hot gas flow G, and a back side 25 which is opposite to the hot gas side 24 and defines a radially outer surface 26 (substantially axial) of the platform 21.

The stator shroud segment 20a further includes a forward leg 27 and a rear leg 28 extending radially outwardly from the back side 25 of the platform 21. The forward and rear legs 27, 28 are configured to be mounted to a stationary structure of the engine, to thereby support the stator shroud segment 20a and thus the stator shroud 20 in position. The structural details of the forward and rear legs may vary in different engines.

An impingement plate 30 is disposed radially outward from the stator shroud segment 20a. The impingement plate 30 extends over the radially outer surface 26 of the platform 21 at a distance thereof. The stator shroud segment 20a, and in particular the platform 21, is cooled by receiving bleed air from, for example, the HPC assembly 14, into the impingement plate 30. Cooling air C may flow through the impingement plate 30, as detailed below.

Figure 3:
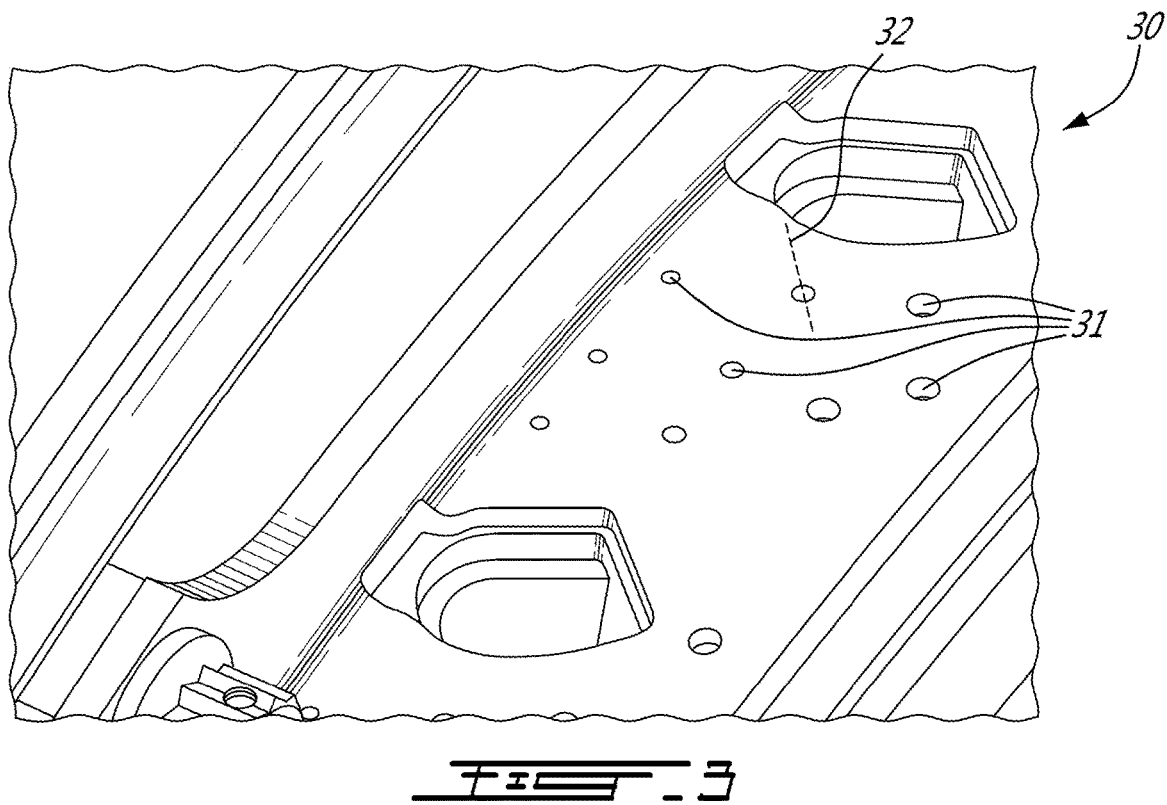
FIG. 3 is a partial perspective view of the stator shroud of FIG. 2, with an impingement plate, viewed from a backside thereof.
Figure 4:
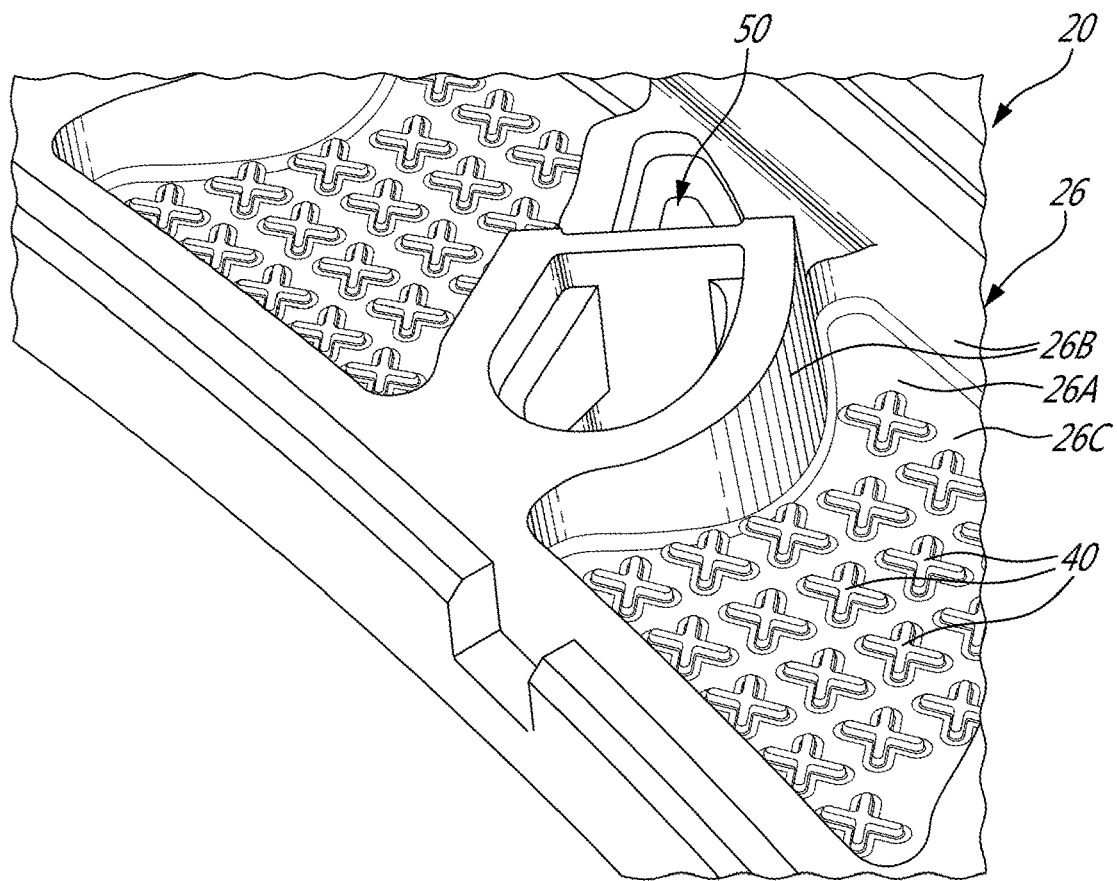
FIG. 4 is a partial perspective view of the stator shroud of FIG. 3 without the impingement plate shown in FIG. 3.

Referring to FIG. 3, one or more impingement holes 31 are defined through the impingement plate 30, in order to direct the cooling air C flowing through the impingement plate 30 toward an area of the back side 25 of stator shroud 20. The impingement holes 31 may thus distribute cooling air C within the cavity 26A (FIG. 4). The impingement holes 31 define high-speed impingement cooling air jets, which target the radially outer surface 26 of the platform 21. In some embodiments, the impingement holes 31 may have a convergent shape to accelerate the cooling air C flowing therethrough. In the depicted embodiment, the impingement holes 31 does not have all the same size, where, as shown, some impingement holes 31 have a greater bore than others. This may be different in other embodiments, where all the impingement holes 31 may have the same bore. The cooling air jets projects on the radially outer surface 26 of the platform 21 transversally to said surface 26. Depending on the orientation of the radially outer surface 26 and/or the impingement holes axis 32, the cooling air jets may project normal to the radially outer surface 26 of the platform 21. However, in the depicted embodiment, the radially outer surface 26 is angled relative to the impingement plate 30 (see FIG. 2), and the cooling air jets are not perpendicular or normal to, but rather oblique relative to the radially outer surface 26.

Thermal energy build up in the stator shroud 20 because of its contact with hot gas flow G during operation of the engine 10 may detrimentally affect the performance of the engine 10 and/or lead to deterioration of hot surfaces of the engine 10. Heat-exchange promoting structures are integrated in the radially outer surface 26 to enhance or maximize heat exchange and therefore help cooling the stator shroud 20. Referring to FIG. 4, there is shown a portion of the stator shroud 20, which is in this case a portion of a stator shroud segment 20a, with the impingement plate 30 removed to see the radially outer surface 26 underneath.

As shown, the back side 25 of the platform 21 defines a recessed area or cavity 26A. The cavity 26A is circumscribed by sidewalls 26B extending from the radially outer surface 26 of the platform 21. The cavity 26A has zones of reduced depth, such that portions of the radially outer surface 26 are recessed relative to others. The recessed portions of the radially outer surface 26 defines a base surface 26C of the cavity 26A and spans over a majority of the backside 25 of the platform 21. Although the base surface 26C is separated in two subsections in the depicted embodiment, other geometries or configurations of such base surface 26C may be provided in other embodiments. The radially outer surface 26 includes the base surface 26C defined herein. For simplicity, the base surface 26C or base surface 26C subsections may be simply referred to as the radially outer surface 26 of the platform 21. As shown, the radially outer surface 26 defines a plurality (a plurality or an array) of protrusions 40 extending away therefrom. The protrusions 40 project respectively along a protrusion axis. These protrusions 40 are exemplary heat exchange promoting structures disposed on the radially outer surface 26.

In the embodiment shown, the protrusions 40 are evenly distributed on the radially outer surface 26 and equally spaced apart from each other. The protrusions 40 may be distributed differently and/or spaced unequally in other embodiments. In the embodiment shown, the protrusions 40 all have the same shape and dimensions. Other configurations may be provided where, for instance, one or more protrusions 40 may be shaped and/or sized differently. This may result from spacing requirements between adjacent protrusions 40 and/or this may be necessary to fit at the contour of the base surface 26C close to the sidewalls 26B to maximize an area of the radially outer surface 26 including such protrusions 40.

As previously discussed, cooling air C through the impingement plate 30, i.e. in the impingement holes 31, may form cooling air jets oriented transversally toward the radially outer surface 26 of the platform 21. Impingement cooling system such as described herein with high speed air jets targeting a surface of the stator shroud 20 may raise the heat transfer coefficient in the process. Cooling air C may enter the cavity 26A defined at the backside 25 of the platform 21 and impinge on the radially outer surface 26, including the protrusions 40. Cooling air C vortices or turbulences may thus be created within the cavity 26A, and cooling air C may exit or be channeled out from the cavity 26A via outlet 50 in fluid communication with an environment outside of the cavity 26A. In some embodiments, the rear leg 28 (FIG. 2) may have holes therethrough for providing a secondary outlet which may contribute to having multidirectional flow in the cavity 26A. The addition of the plurality of protrusions 40 on the radially outer surface 26, compared to radially outer surface 26 without such protrusions 40, may produce greater vortices or turbulences within the cavity 26A and therefore increase the convective heat transfer coefficient. A continuous cooling air C flow entering the cavity 26A via the impingement holes 31 and exiting the cavity 26A via outlet 50 and/or holes through the rear leg 28 if present may thus cool the platform 21, which is heated via hot gas flow G on its hot gas side 24 during operation of the engine 10, via convective heat exchange on its back side 25. The presence of the plurality of protrusions 40 may enhance the cooling efficiency, as it may increase the cooled surface area, i.e. via the addition of heat-exchange promoting structures, and/or may increase local turbulence thereby energizing the cooling flow. The protrusions 40 may thus cooperate with cooling air C within the cavity 26A and increase the overall surface area in fluid contact with said cooling air C.

Figure 5:
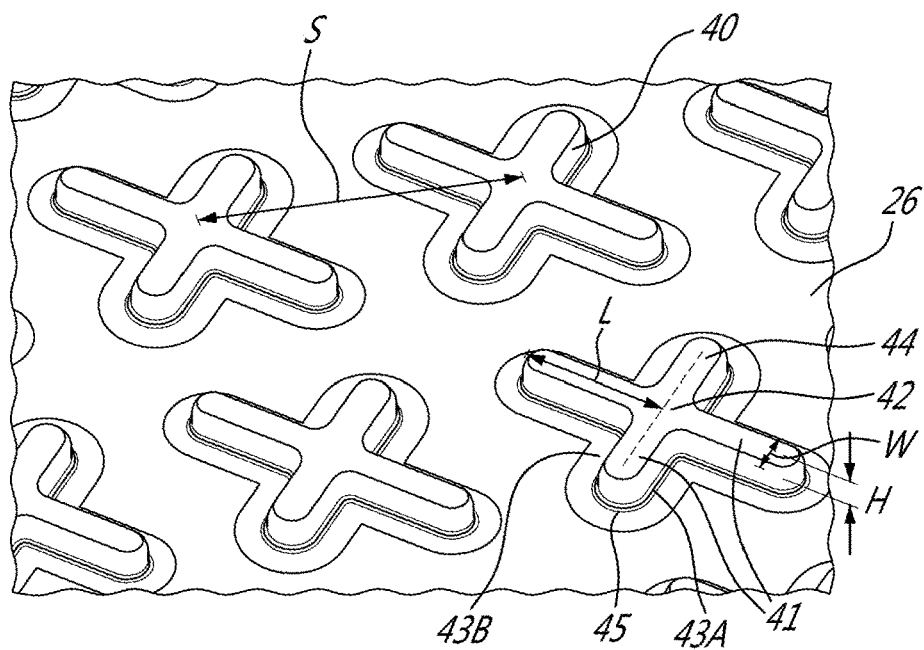
FIG. 5 is a close-up view of protrusions on a radially outer surface at the backside of the stator shroud shown in FIGS. 2-4.

The protrusions 40 have a multi-directional configuration, or stated differently have "flow-direction independent" features, which may be desirable in complex flow environment. Referring to FIG. 5, a close-up partial view of the radially outer surface 26 of the platform 21 is depicted, where exemplary protrusions 40 are shown. Features of a single protrusion 40 are detailed below.

The protrusion 40 has a plurality of elongate members 41 in the form of straight legs having a length L, a width W, and a height H. The elongate members 41 intersect each other and extend away from a common location. In the embodiment shown, the protrusion 40 includes four elongate members 41 intersecting each other and extending in different directions away from a common point, which is defined in this embodiment by the center 42 of the protrusion 40. As illustrated, the protrusion 40 has a cruciform or cruciate cross-sectional shape when viewed in a plane that is normal to the protrusion axis of the protrusions 40. As noted above, the protrusions 40 extend away from the radially outer surface of the platform along the protrusion axis. This plane may be substantially parallel, and spaced apart from (or stated differently, extending over), the radially outer surface 26.

Figure 6A:
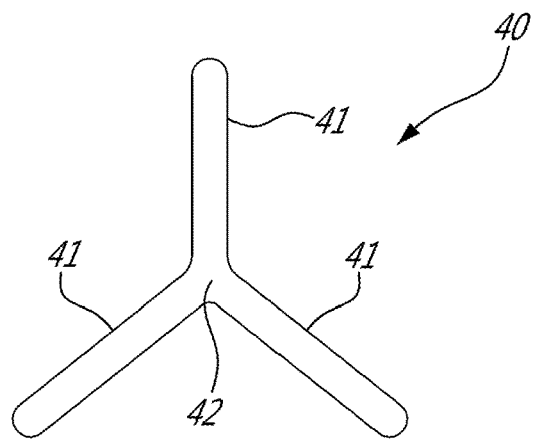
FIGS. 6A, 6B and 6C are illustrations of other exemplary protrusion geometries.
Figure 6B:
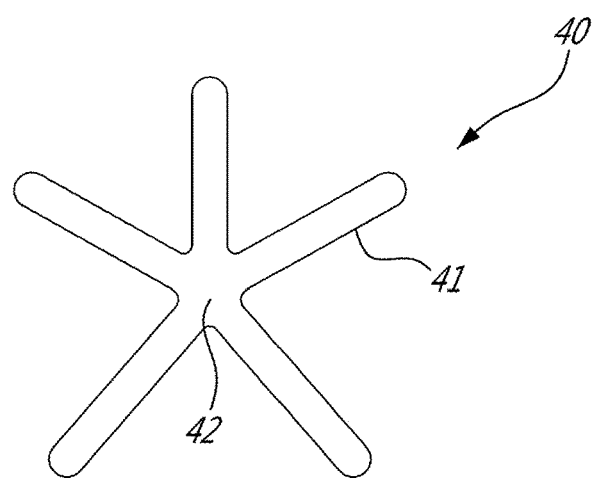
Figure 6C:
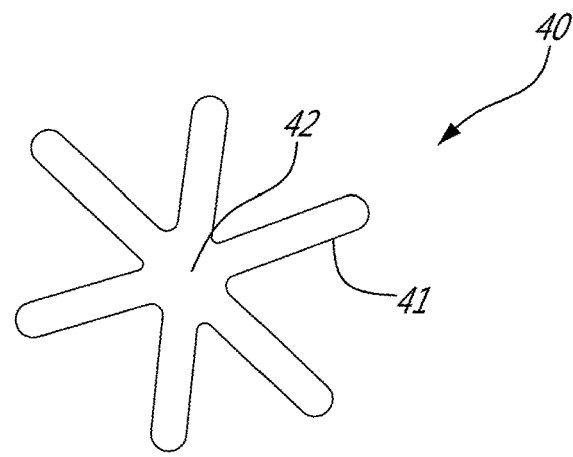

The protrusions 40 as shown include four elongate members 41 each extending in directions at 90° relative to an adjacent one of the elongate members 41. Upon impingement of the radially outer surface 26 having the plurality of protrusions 40, the cooling air C flow diffuses on the protrusions 40 such that the cooling air C flow may project along the elongate members 41 forming the cruciate protrusions 40 in opposite directions at the radially outer surface 26. In other embodiments, there may be more or less elongate members 41 forming the protrusion 40, with or without the same relative angle between adjacent ones of the elongate members 41. The protrusion 40 may have other cross-sectional shapes in other embodiments. For instance, other exemplary geometries are shown in FIGS. 6A, 6B and 6C. As shown, the protrusion 40 have more than two elongate members 41, such as three elongate members 41 (FIG. 6A), five elongate members 41 (FIG. 6B) and six elongate members 41 (FIG. 6C), for instance. While in the embodiments shown the elongate members 41 intersect each other at a common location or center 42, other geometries (not shown) of protrusions 40 may be provided where the elongate members 41 may not all intersect at a common location, such as where one or more elongate members 41 do not irradiate from a same point than one or more others.

Returning to FIG. 5, all the elongate members 41 have the same shape and size. In other words, all the elongate members 41 have the same length L, height H and width W. The elongate members 41 may have different parameters, such as different length, height and/or width in other embodiments. In the depicted embodiment, the elongate members 41 extend straight. In other words, there is substantially no curvature along the length L of the elongate member 41, apart from curvatures of surfaces along the length L. This may be different in other embodiments, where, for instance, one or more of the elongate members 41 may be skewed along its length L or includes webs or "branches" extending from one or more sides of the elongate members 41 to form more complex networks or clusters of members extending outwardly away from the center 42 of the protrusions 40. The protrusions 40 on the entire radially outer surface 26 are all oriented identically on the radially outer surface 26. Stated differently, the elongate members 41 of the protrusions 40 all extend in the same respective directions, where no protrusion 40 is rotated about its center 42 relative to an adjacent one of the protrusions 40.

In the depicted embodiment, each elongate member 41 is curved on its entire surface. Opposite sides 43A, 43B of an elongate member 41 have a concave section having a radius R1 from the base surface 26C which transitions in a convex section having a radius R2. Both radii R1, R2 may be identical or different, depending on the embodiment. Opposite sides 43A, 43B of an elongate member 41 emerge from the base surface 26C and follow a curved profile to converge at an apex 44 of the elongate member 41, where such apex 44 is rounded and devoid from flat surface. The apex 44 thus divides longitudinally a respective elongate member 41 into a first side 43A and a second side 43B extending along the length L of the elongate member 41. In the example shown, the first and second sides 43A, 43B are symmetrical along the apex 44 of the elongate member 41. The first and second sides 43A, 43B, or simply the elongate member 41, may be asymmetrical along the apex 44 in other embodiments.

In some embodiments, such as the depicted one, the longitudinal end 45 of an elongate member 41 may also or alternatively be rounded or curved. In other words, the first and second sides 43A, 43B of the elongate member 41 extend along the length L of the elongate member 41 and converge at the longitudinal end 45 of the elongate member 41 to form a smooth rounded end. As such, in the embodiment shown, any contour surfaces of the elongate member 41, and more generally in this embodiment the whole contour of the protrusion 40 has a curvilinear profile. The contour of the protrusion 40 may therefore define various sides or surfaces transitioning into one another in a combination of concave and convex surface sections.

In the embodiment shown, the protrusions 40 are shallow. The protrusions 40 protrude away from the base surface 26C a smaller distance in comparison with traditional (much longer) pin fins. In an embodiment, the protrusions 40 may have a ratio of height H to width W (H:W) between 6:5 and 5:6. In a particular embodiment, such ratio H:W is 1:1. Different ratios may be found in other embodiments. Protrusions 40 with such parameter may be less prone to break and/or easier to manufacture than traditional elongated pin fins with substantially higher profile.

Limiting the length L of the elongate members 41 may be desirable in some embodiments, as the furthest the elongate members 41 extend from the center 42 of the protrusion 40, the more uniaxial, rather than multi-directional, the cooling efficiency gains may become. In an embodiment, the length L of the elongate members 41 versus the height H of said elongate members 41 is 3:1. Such ratio may contribute to enhancing the cooling efficiency without substantially compromising manufacturability. Other ratios may be contemplated in other embodiments without substantially compromising manufacturability while increasing cooling efficiency of the platform 21 with the integrated protrusions 40 over a platform without such protrusions 40.

As mentioned above, the protrusions 40 are spaced apart from one another. A spacing S between adjacent protrusions 40 may be defined as a distance between the center 42 of adjacent protrusions 40. A correlation may be drawn between the spacing S and one or more dimensions of the protrusions 40 or elongate members 41 thereof. For instance, in an embodiment, a ratio of the height H over the spacing S (H:S) of the protrusions may be between 4:1 and 14:1. In a particular embodiment, the ratio H:S is 7:1. The ratio H:S may be different in other embodiments. Heat exchange may tend to decrease where such ratio is increased, i.e. decreased height H over the spacing S. With lower ratios, i.e. increased height H over the spacing S, some embodiments may still provide increased cooling efficiency, but higher protrusions may had some weight and may reduce manufacturability, for instance.

In some embodiments, heat transfer capabilities of these protrusions 40 may be substantially constant regardless of the direction of the cooling air C flow after the impingement cooling air jets have impinged upon the radially outer surface 26. Other suitable protrusion geometries may be used to effectively optimize heat transfer and/or optimize a surface-flow interaction.

The protrusions 40 are integrally cast on the radially outer surface 26 of the platform 21. In some cases, such as shown herein, there are no subsequent machining steps required to produce the protrusions, which may be desirable for cost-effectiveness, for instance. Any suitable manufacturing techniques may be used to manufacture such stator shroud or stator shroud segment(s) 20a. For instance, the stator shroud 20 or stator shroud segment(s) 20a, including the protrusions 40 defined thereon, may be manufactured from a powder injection molding process or any other process creating an intermediary green part, i.e. a part including a solidified binder that holds a material powder together with the binder being removed before the part is in its final form.

The above description is meant to be exemplary only, and one skilled in the art will recognize that changes may be made to the embodiments described without departing from the scope of the invention disclosed. For instance, although described herein in connection with a stator shroud 20 or stator shroud segment(s) 20*a*, the heat-exchange promoting structures described herein may be suitable for other turbomachine parts, more particularly but not limited to parts where impingement cooling may be implemented, such as for vane inner shrouds, shroud segments such as blade outer air seals, and combustor panels, for instance. Still other modifications which fall within the scope of the present invention will be apparent to those skilled in the art, in light of a review of this disclosure, and such modifications are intended to fall within the appended claims.

The invention claimed is:

1. A stator of a gas turbine engine, the stator comprising:
a static shroud of the stator defining a platform having a radially outer surface;
an impingement plate having impingement holes extending therethrough, the impingement plate radially spaced apart from the radially outer surface of the platform, the impingement holes configured to direct a high-speed cooling air flow transversally to the radially outer surface of the stator shroud; and
a plurality of protrusions projecting away from the radially outer surface of the platform along a protrusion axis, the protrusions having a cruciate cross-sectional shape when viewed in a plane normal to the protrusion axis.

2. The stator shroud as defined in claim 1, wherein the protrusions each define four elongate members having a length and opposite sides extending along the length, the opposite sides emerging from the radially outer surface and having a curved profile converging at a rounded apex of the elongate members, respective rounded apexes of the elongate members dividing longitudinally respective elongate members.

3. The stator shroud as defined in claim 2, wherein longitudinal ends of respective elongate members are rounded.

4. The stator shroud as defined in claim 2, wherein respective rounded apexes divide respective elongate members into respective first sides and second sides extending along the length of respective elongate members, the first and second sides being symmetrical along the rounded apexes.

5. The stator shroud as defined in claim 4, wherein the first and second sides of a respective elongate member extend along the length of said elongate member and converge at a longitudinal end of the elongate member in a rounded end.

6. The stator shroud as defined in claim 1, wherein the protrusions each define four elongate members each extending in directions at 90° relative to an adjacent one of the elongate members.

7. The stator shroud as defined in claim 1, wherein the protrusions each define four elongate members having a width W and a height H, a ratio H:W ranging between 6:5 and 5:6.

8. The stator shroud as defined in claim 7, wherein the ratio H:W is 1:1.

9. The stator shroud as defined in claim 1, wherein the protrusions are all oriented identically on the radially outer surface.

10. The stator shroud as defined in claim 1, wherein the protrusions are evenly distributed on the radially outer surface and equally spaced apart from each other.

11. A stator shroud of a high pressure turbine of a gas turbine engine, the stator shroud comprising:
a shroud platform defining a hot gas side in fluid communication with a hot gas flow of the engine and an opposite back side defining a radially outer surface of the stator shroud; and
a plurality of protrusions spaced apart from one another and projecting from the radially outer surface, the protrusions having more than two elongate members intersecting one another and extending in different directions along the radially outer surface.

12. The stator shroud as defined in claim 11, wherein the elongate members have a length and have opposite sides extending along the length, the opposite sides emerging from the radially outer surface and having a curved profile converging at a rounded apex of the elongate members, respective rounded apexes of the elongate members dividing longitudinally respective elongate members.

13. The stator shroud as defined in claim 11, wherein a contour of the elongate members defines surfaces transitioning into one another in a combination of concave and convex surface sections, the contour of the elongate members being devoid from flat surfaces.

14. The stator shroud as defined in claim 11, wherein the elongate members have a width W and a height H, a ratio H:W ranging between 6:5 and 5:6.

15. The stator shroud as defined in claim 11, wherein all the elongate members forming one protrusion have a same length.

16. The stator shroud as defined in claim 11, wherein the elongate members forming one protrusion intersect at a common location defined in said protrusion.

17. The stator shroud as defined in claim 16, wherein the elongate members extend in directions at 90° relative to an adjacent one of the elongate members.

18. A method of cooling a stator of a gas turbine engine, the method comprising:
receiving a cooling air flow from bleed air of the engine into a cavity of the stator outside a shroud of the stator;
directing the cooling air form the cavity directly onto a radially outer surface of a platform of the stator shroud in impingement cooling jets transverse to said radially outer surface, including directing the impingement cooling jets on a plurality of cruciate protrusions projecting from the radially outer surface with the cooling air; and
channeling the cooling air flow outside the cavity via a cavity outlet.

19. The method as defined in claim 18, wherein impingement upon the plurality of cruciate protrusions includes diffusing the cooling air flow on the protrusions such that the cooling air flow project along elongate members forming the cruciate protrusions in opposite directions at the radially outer surface.

20. The method as defined in claim 18, wherein distributing the cooling air flow includes accelerating the cooling air flow entering the cavity via a convergent shape of the impingement holes.

* * * * *